(12) United States Patent
Philpott et al.

(10) Patent No.: US 12,681,754 B1
(45) Date of Patent: Jul. 14, 2026

(54) HANDLING WORKLOAD INTERRUPTIONS IN CLOUD COMPUTING PLATFORMS

(71) Applicant: Citibank, N.A., New York, NY (US)

(72) Inventors: Mark Philpott, London (GB); Dominic Burgan, London (GB); Steven Readett, London (GB); Krzysztof Jastrzebski, Warsaw (PL); Isaac Kilis, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/300,117

(22) Filed: Aug. 14, 2025

(51) Int. Cl.
| | |
|---|---|
| *G06F 9/48* | (2006.01) |
| *G06F 9/50* | (2006.01) |
| *G06F 11/14* | (2006.01) |

(52) U.S. Cl.
CPC .......... *G06F 9/4812* (2013.01); *G06F 9/5072* (2013.01); *G06F 11/1407* (2013.01)

(58) Field of Classification Search
CPC ... G06F 9/4812; G06F 9/5072; G06F 11/1407
See application file for complete search history.

(56) References Cited

U.S. PATENT DOCUMENTS

| | | | | |
|---|---|---|---|---|
| 8,677,353 | B2 * | 3/2014 | Machida ............... | G06F 9/5077 718/1 |
| 10,216,541 | B2 * | 2/2019 | Le Bars ............... | H04N 19/426 |
| 10,387,198 | B2 * | 8/2019 | Poort ................... | G06F 9/5027 |
| 10,887,246 | B2 * | 1/2021 | Tantawi .............. | H04L 67/1097 |
| 11,886,932 | B1 * | 1/2024 | Dasgupta ............. | G06F 9/4881 |
| 11,989,586 | B1 * | 5/2024 | Srikanta ................. | G06F 9/505 |
| 12,135,989 | B2 * | 11/2024 | Poort ................... | G06F 21/105 |
| 2017/0185450 | A1 * | 6/2017 | Le Bars ............... | G06F 9/5077 |
| 2023/0376343 | A1 * | 11/2023 | Stoppa ................. | G06F 9/4812 |
| 2023/0401088 | A1 * | 12/2023 | Poddar ..................... | G06F 8/60 |
| 2024/0126615 | A1 * | 4/2024 | Nadathur ........... | G06F 11/3433 |

* cited by examiner

*Primary Examiner* — Steven G Snyder
*Assistant Examiner* — Christopher A Daley
(74) *Attorney, Agent, or Firm* — Perkins Coie LLP

(57) ABSTRACT

A system for handling interrupts in a cloud computing environment is disclosed. The system may include a controller process that receives an interrupt indicator from a worker process, signaling a potential interruption. The controller may determine if the worker process is expected to be halted and removed within a predetermined time period. If so, the controller may transmit a status request to the worker process. In response, the controller may receive completed task results and determine uncompleted tasks. The controller may generate a checkpoint data structure indicating completed and uncompleted tasks. A computational payload comprising the completed results and checkpoint data structure may be transmitted for recording within the cloud computing system. This approach may enable efficient management of computational resources and task continuity in cloud environments subject to periodic process halting and removal.

18 Claims, 7 Drawing Sheets

| Interrupt ID | TimeStamp | Interrupt Type | Interrupt Data |
|---|---|---|---|
| 12 | 2023-09-25 18:45:30 | \<Type Data\> | \<Data_1\> |

203    206    209    212

200

300

| Task ID | Computational Result |
|---------|---------------------|
| 1211 | <Result_1> |
| 1221 | <Result_2> |
| 1241 | <Result_3> |

| Task ID | Computational Result |
|---------|---------------------|
| 12345 | <NULL> |
| 12346 | <NULL> |
| 12347 | <NULL> |

| Task ID | Computational Result | Task Data |
|---------|----------------------|-----------|
| 22345 | <Result> | <Data_1> |
| 22346 | <NULL> | <Data_2> |
| 22347 | <NULL> | <Data_3> |

HANDLING WORKLOAD INTERRUPTIONS IN CLOUD COMPUTING PLATFORMS

BACKGROUND

With the advent of cloud computing, resource allocation has become increasingly important. Cloud computing systems may include a large number of computing devices that have various combinations of memory, processors, disk space, etc. Those resources may be allocated on-demand to hosted applications or tasks being performed in the cloud. Although cloud computing systems have vast resources to be allocated, those resources are still limited because of a large number of applications that now reside in the cloud. Thus, cloud computing platforms often face challenges in efficiently managing and allocating resources across numerous applications and workloads. As the demand for cloud-based services continues to grow, the complexity of resource allocation systems increases. These systems must balance the needs of various tasks and applications while operating within the constraints of available hardware.

SUMMARY

One particular challenge in cloud resource management is handling workload interruptions. When a task or application is interrupted due to resource reallocation or other factors, it can lead to inefficiencies and potential data loss. Developing robust mechanisms to gracefully handle these interruptions and ensure continuity of operations is an ongoing area of focus in cloud computing research and development. An interrupt handling system may be used to perform operations described herein. In particular, the interrupt handling system may handle workload interruptions in cloud computing platforms. The interrupt handling system may receive an interrupt indicator from a worker process signaling a potential interruption. The system may then determine whether the worker process is expected to be halted and removed within a predetermined time period. Based on this determination, the interrupt handling system may transmit a status request to the worker process. In response to receiving a first set of computational results for completed tasks from the worker process, the interrupt handling system may determine a second set of tasks that have not been completed by the worker process and may generate a checkpoint data structure indicating completed and uncompleted tasks. The interrupt handling system may then transmit a computational payload that includes the results and checkpoint data structure to be recorded within the cloud computing system.

The interrupt handling system may reside within controller processes and worker processes within a cloud computing environment. Specifically, the interrupt handling system (e.g., within a particular controller process residing within a container within a pod) may receive, using a controller process within a cloud computing system, an interrupt indicator from a worker process. The interrupt indicator may signal a potential interruption to the worker process. Each worker process may be one of a multitude of worker processes and may be associated with a corresponding controller process of a multitude of controller processes, such that each controller process may manage a corresponding worker process. For example, the controller process may be a supervisory program that monitors and manages a worker process performing computational tasks.

The interrupt handling system may evaluate whether the worker process is likely to be terminated soon. Specifically, the system may determine, based on the interrupt indicator, whether the worker process is expected to be halted and removed by the cloud computing system within a predetermined time period. The cloud computing system may periodically halt and remove processes to manage assigned computing resources. For example, the system may analyze the interrupt indicator to estimate whether the worker process will be terminated within the next two minutes based on cloud resource allocation policies.

The interrupt handling system may request a status update from the worker process based on the interrupt. Specifically, based on determining that the worker process is expected to be halted and removed by the cloud computing system, the system may transmit a status request to the worker process. For example, when the controller process determines that the interrupt is from the cloud computing system indicating termination of the worker process, the controller process may send a message to the worker process asking for its current progress and any completed results.

The interrupt handling system may receive, based on the status request, completed work from the worker process. Specifically, in response to the status request, the system may receive, from the worker process, a first set of computational results for a first set of tasks that have been completed by the worker process. For example, the worker process may return partial results for three out of five assigned computational tasks that it has finished so far.

The interrupt handling system may identify remaining work for the worker process. Specifically, the interrupt handling system may determine, based on the first set of computational results, a second set of tasks that have not been completed by the worker process. The first set of tasks and the second set of tasks may be tasks assigned to the worker process to complete. For example, if the worker process was assigned five total tasks and returned results for three, the system may determine that two tasks remain incomplete.

The interrupt handling system may then create a record of completed and remaining work. Specifically, the system may generate, for the worker process, a checkpoint data structure that indicates that the first set of tasks has been completed and that the second set of tasks has not been completed. For example, the checkpoint data structure may be a file, a message, or another suitable data structure that lists completed tasks with their results and uncompleted tasks marked as pending.

The interrupt handling system may save the completed work and progress record. Specifically, the system may transmit, to be recorded within the cloud computing system, a computational payload including the first set of computational results and the checkpoint data structure. For example, the system may send the partial results and checkpoint file to a central database or another suitable location within the cloud to be stored for later retrieval and processing.

As discussed above, the interrupt handling system may create a structured record of completed and pending tasks. Specifically, the system may generate a checkpoint data structure for the worker process. For example, the checkpoint data structure may be implemented as a JSON object, an XML file, or database table with fields for task status and results.

In some implementations, the interrupt handling system may add completed tasks to the checkpoint data structure. Specifically, the system may input the first set of tasks into the checkpoint data structure. For example, the system may iterate through the list of completed tasks and add each task ID to a "completed" array within the data structure.

The interrupt handling system may associate results with completed tasks in the checkpoint data structure. Specifically, the system may assign, within the checkpoint data structure, a corresponding computational result to each task in the first set of tasks. For example, for each completed task, the system may store the task's output or return value alongside its ID in the data structure.

Furthermore, the interrupt handling system may add pending tasks to the checkpoint data structure. Specifically, the system may input the second set of tasks into the checkpoint data structure. For example, the system may add task IDs for uncompleted work to a separate "pending" array within the data structure.

The interrupt handling system may then mark pending tasks in the checkpoint data structure. Specifically, the system may generate, within the checkpoint data structure, a corresponding flag for each task in the second set of tasks, wherein the corresponding flag indicates that a corresponding task has not been completed. For example, the system may set a boolean "completed" field to false for each pending task or add a "status" field with the value "pending".

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF FIGURES

Non-limiting and non-exhaustive examples are described with reference to the following figures.

FIG. 3 illustrates a task data structure for tracking computational tasks and results, according to aspects of the present disclosure.

FIG. 4 illustrates another task data structure for tracking computational tasks and results, according to an embodiment.

FIG. 5 illustrates a checkpoint data structure for tracking tasks, results, and associated data, according to aspects of the present disclosure.

DETAILED DESCRIPTION

Figure 1:
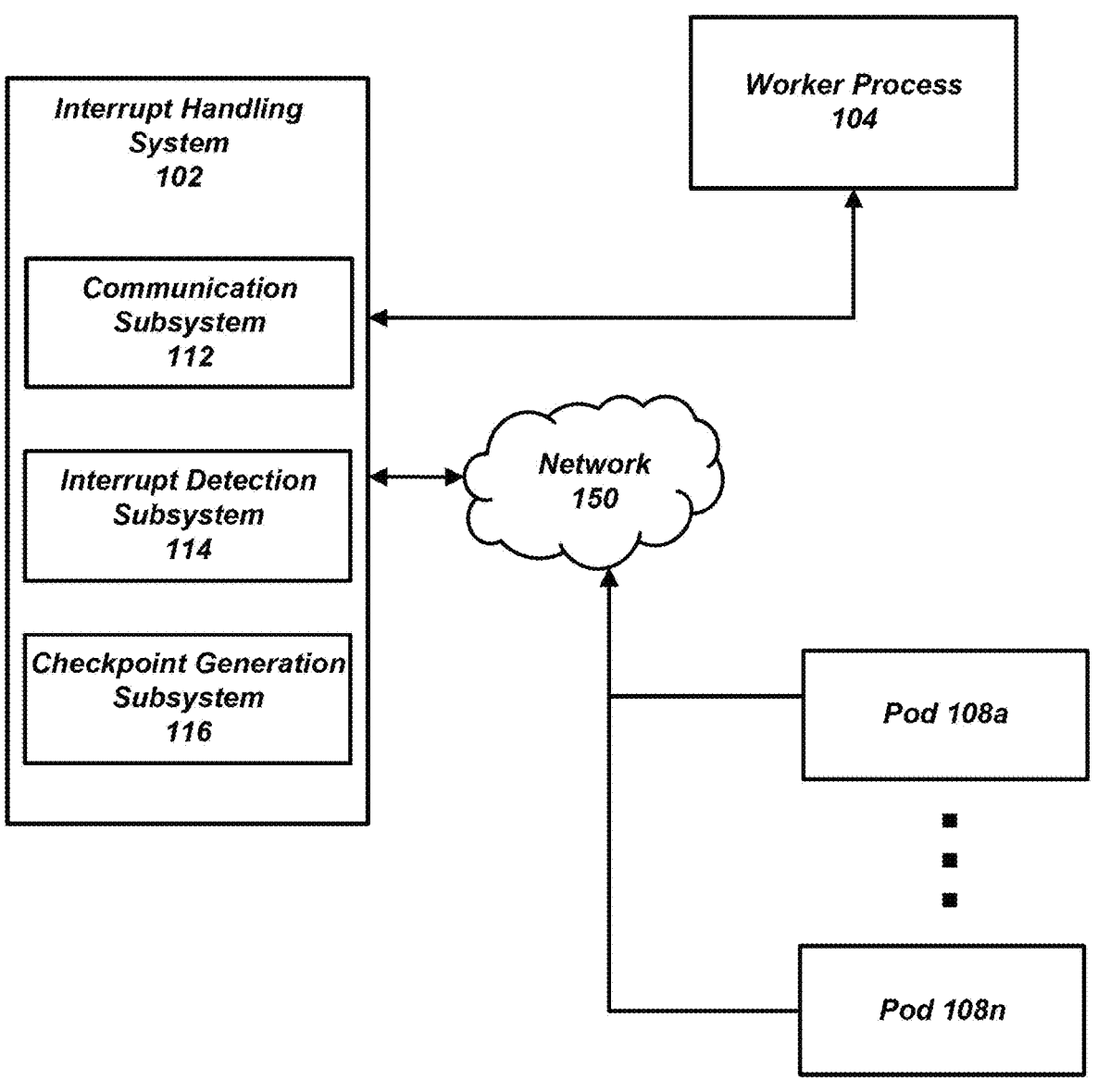
FIG. 1 illustrates a block diagram of a computing environment, according to aspects of the present disclosure.

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system/process to handle workload interruptions in cloud computing platforms in view of the available conventional approaches created significant technological uncertainty. Creating such platform/system/process required addressing several unknowns in conventional approaches in cloud resource management, such as efficiently preserving computational progress during unexpected process terminations. Similarly, conventional approaches in interrupt handling did not adequately address the challenge of maintaining task continuity across distributed cloud environments with dynamically allocated resources.

Conventional approaches rely on periodic checkpointing at fixed intervals, which do not adapt to the dynamic nature of cloud resource allocation. For example, a conventional system may create checkpoints too infrequently, and fail to capture recent computational progress before an interrupt occurs. Conventional approaches typically involve centralized interrupt handling, which can lead to bottlenecks and single points of failure in large-scale cloud environments. Conversely, the disclosed system implements a distributed interrupt handling approach with adaptive checkpointing based on real-time interrupt indicators.

Additionally, the integration of interrupt handling with containerized cloud architectures created further technological uncertainty, since the legacy interrupt handling mechanisms were not designed for highly dynamic and isolated container environments. Legacy interrupt handling approaches often assume persistent storage and stable network connections, which may not be guaranteed in containerized cloud platforms. To successfully integrate legacy interrupt handling capabilities with modern cloud architectures, factors such as container lifecycle management, inter-container communication, and ephemeral storage must be taken into consideration.

To overcome the technological uncertainties, the inventors systematically evaluated multiple design alternatives. For example, the inventors experimented with different communication protocols between controller and worker processes to minimize latency in interrupt detection and response. The inventors also explored various data structures for efficiently representing task completion status and computational results, which allowed the inventors to optimize the checkpoint generation process for minimal overhead while preserving critical state information.

The use of a fully centralized interrupt handling architecture proved to be problematic for scalability as it failed to efficiently manage large numbers of distributed worker processes, leading to increased latency and potential data loss during interrupts. Similarly, a naive approach of continuous checkpointing did not balance the tradeoff between computational overhead and data preservation effectively. Further, relying solely on cloud platform-provided interrupt signals ignored the potential benefits of application-level interrupt detection and handling for more granular and context-aware interrupt management.

Thus, the inventors experimented with different methods for distributed interrupt detection and adaptive checkpointing. For example, the inventors tested various algorithms for predicting imminent process termination based on cloud resource metrics and historical data to identify the most efficient and effective approaches. Additionally, the inventors systematically evaluated different strategies for checkpoint data compression and storage. The inventors evaluated, for example, different methods of serializing task state information, such as comparing the performance and compatibility of various data interchange formats like JSON, Protocol Buffers, and custom binary encodings.

FIG. 1 is an example of a computing environment 100 for handling interrupt events. Computing environment 100 includes interrupt handling system 102 (e.g., within a controller process), worker process 104, and pods 108a-108n. Interrupt handling system 102 may execute instructions for handling interrupt events. Interrupt handling system 102 may include software, hardware, or a combination of the two. For example, interrupt handling system 102 may be hosted on a physical server or a virtual server that is running on a physical computer system. The controller process may be a process that manages worker process 104. Both the controller process and the worker process may be executing with the same pod, but may be in different containers.

FIG. 1 illustrates the key components of the interrupt handling system within the computing environment 100. The primary subsystems shown include interrupt handling system 102, which contains communication subsystem 112, interrupt detection subsystem 114, and checkpoint generation subsystem 116. The environment also includes a worker process 104 and multiple pods (108a-108n), all interconnected via a network 150. Network 150 may be a local area network a wide area network (e.g., the Internet) or a combination of both.

Communication subsystem 112 facilitates data exchange between interrupt handling system 102 and the worker process 104, enabling the transmission of interrupt indicators, status requests, and computational results. Interrupt detection subsystem 114 monitors the computing environment for potential interruptions, analyzing incoming signals to determine if a worker process may be halted or removed. Checkpoint generation subsystem 116 creates and manages checkpoint data structures, which record the status of completed and pending tasks when an interrupt occurs.

These subsystems work together to manage workload interruptions efficiently. For example, when the interrupt detection subsystem 114 identifies a potential interruption, it triggers communication subsystem 112 to send a status request to the affected worker process 104. The worker process responds with completed task results, which are then processed by interrupt handling system 102. Checkpoint generation subsystem 116 uses this information to create a comprehensive record of the work status, including both completed and pending tasks. This checkpoint data, along with the partial results, is then transmitted through network 150 to be recorded within the cloud computing system, ensuring that progress is preserved even if the worker process is terminated. Pods 108a-108n represent the containerized environments where these processes operate, providing isolation and resource management within the larger cloud infrastructure.

Thus, in some implementations the worker process and the controller process may be communicating through a local network (e.g., localhost), when being executed in the same pod. This enables efficient inter-process communication without requiring data to traverse external networks. This localhost communication typically occurs through TCP/IP sockets bound to the loopback interface (127.0.0.1 or ::1 for IPV6), providing high-speed, low-latency data transfer between processes running on the same machine. The localhost connection allows the controller process to send status requests, receive computational results, and transmit signals to the worker process with minimal network overhead. Additionally, this local communication channel remains functional even when external network connections are disrupted, ensuring reliable coordination between the controller and worker processes during potential interruption events. The localhost communication may be implemented using various protocols such as HTTP, gRPC, or direct socket connections depending on the specific requirements of the cloud computing environment.

Container-to-container communication may be facilitated through a combination of networking abstractions. Pods, which are the smallest deployable units, may contain one or more containers that share the same network namespace. This shared namespace allows containers within the same pod to communicate with each other using localhost, as they share the same Internet Protocol (IP) address and port space. For communication between pods, a flat network model may be implemented where each pod is assigned a unique IP address within the cluster. This model may allow pods to communicate with each other directly without the need for Network Address Translation (NAT).

Services may be used as an abstraction layer to provide stable network endpoints for pods. Services may act as load balancers, distributing traffic across multiple pod instances and providing a single point of access for a set of pods. For more fine-grained control over pod-to-pod communication. Network policies may be defined and implemented to allow administrators to define rules for ingress and egress traffic between pods. These policies may be used to implement security measures and restrict communication paths within the cluster.

The Container Network Interface (CNI) may be used to configure networking for containers. CNI plugins may be responsible for setting up the network infrastructure that enables pod-to-pod communication across different nodes in the cluster. This may include creating virtual interfaces, configuring routing tables, and managing IP address allocation. Through these mechanisms, a flexible and scalable networking environment may be provided that enables efficient container-to-container communication within and across pods, supporting the dynamic nature of containerized applications in cloud-native environments.

In some implementations the worker process (e.g., worker container) and the controller process (e.g., the controller container hosting interrupt handling system 102) may be located within different pods. Containers located in different pods may communicate through various network protocols and mechanisms. The cluster network model enables pods to reach each other via IP addresses, regardless of the node they are running on. This communication may be facilitated through services, which provide stable network endpoints for sets of pods. Network protocols used for inter-pod communication may include TCP and UDP. These protocols may be utilized over the cluster's internal network, allowing containers to exchange data reliably. Additionally, HTTP and gRPC protocols may be employed for application-layer communication between services.

Network policies may be defined to control traffic flow between pods. These policies may specify rules for ingress and egress traffic, allowing administrators to implement security measures and restrict communication paths within the cluster. Network policies may be enforced by network plugins that support this feature. CNI plugins may be responsible for setting up the network infrastructure that enables pod-to-pod communication across different nodes in the cluster. These plugins may create virtual interfaces, configure routing tables, and manage IP address allocation. Various CNI plugins may be used depending on the specific requirements of the cluster and the underlying infrastructure. Ingress controllers may be utilized to manage external access to services within the cluster. These controllers may provide a way to route external HTTP and HTTPS traffic to internal services based on rules defined in Ingress resources. This may allow for more sophisticated routing and load balancing of external traffic entering the cluster.

In some implementations, interrupt handling system 102 may receive an interrupt indicator from a worker process (e.g., worker process 104). The interrupt handling system may include components for processing and managing computational tasks. Specifically, the system may include one or more processors and one or more memories configured to store instructions that when executed by the one or more processors perform operations. For example, the system may utilize one or more central processing units (CPUs) to execute instructions stored in random access memory (RAM) to carry out the interrupt handling operations.

Interrupt handling system 102 may receive notifications (e.g., via communication subsystem 112) of potential disruptions to ongoing processes. Specifically, the system may receive, using a controller process of a plurality of controller processes within a cloud computing system, an interrupt indicator from a worker process of a plurality of worker processes. The interrupt indicator may signal a potential interruption to the worker process. Each worker process of the plurality of worker processes may be associated with a corresponding controller process of the plurality of controller processes. Each controller process may manage a corresponding worker process. For example, the interrupt detection subsystem may monitor network traffic for interrupt signals and pass them to the communication subsystem to relay to the appropriate controller process.

Figure 2:
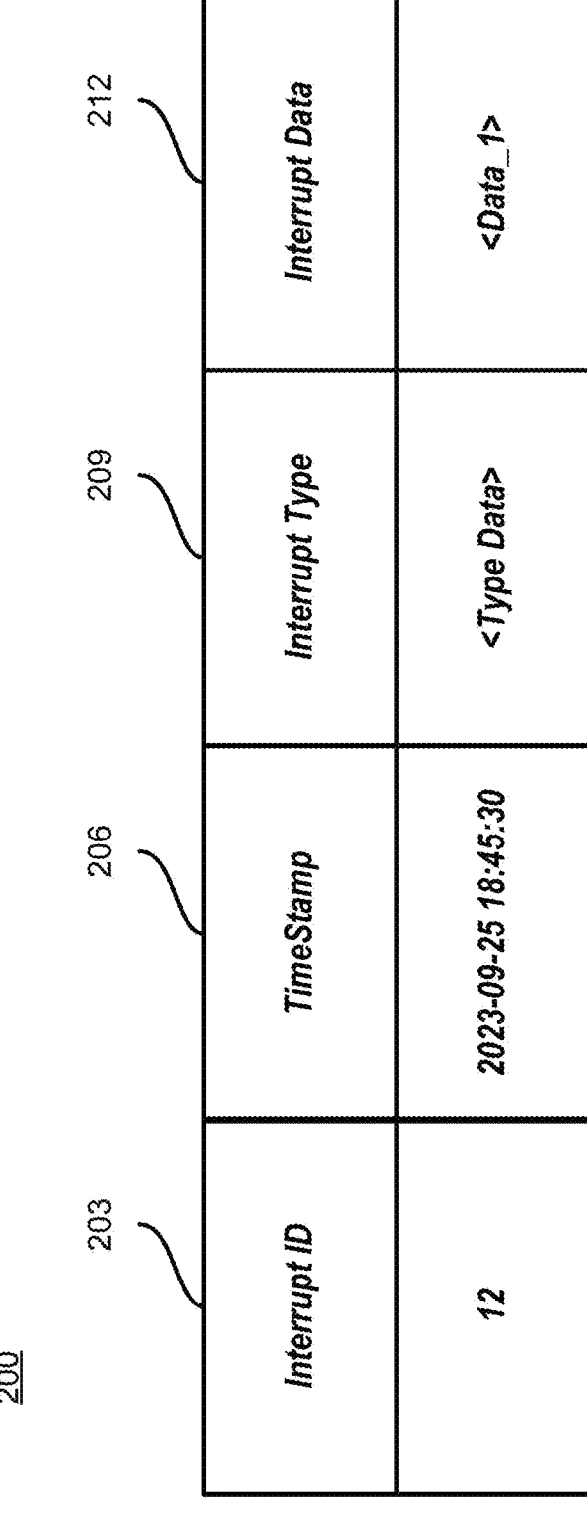
FIG. 2 illustrates a data structure for tracking interrupt events, according to an embodiment.

FIG. 2 illustrates an excerpt of interrupt message 200 that may be used to communicate interrupt information between components of computing environment 100. Interrupt message 200 may include an interrupt identifier 203, a timestamp 206, an interrupt type 209, and interrupt data 212. Communication subsystem 112 of interrupt handling system 102 may receive the interrupt indicator in the form of interrupt message 200. Interrupt identifier 203 may be a unique numerical identifier for each interrupt event, such as "12" as shown in FIG. 2. In some implementations interrupt identifier 203 may be an alphanumeric string or another suitable identifier. Timestamp 206 may record the precise date and time when the interrupt occurred. The time stamp may allow interrupt handling system 102 to count elapsed time from the interrupt occurring. Interrupt type 209 may specify the classification or category of the interrupt event, while interrupt data 212 may store specific payload information or details associated with the interrupt event. For example, interrupt type may indicate with the interrupt was caused by the cloud computing system or by something occurring within the worker process itself.

Interrupt detection subsystem 114 may analyze the received interrupt message 200 to determine the nature and significance of the potential interruption. In some implementations, interrupt type 209 may indicate that the worker process 104 is subject to a spot interrupt from the cloud computing system. A spot interrupt may give a 2-minute warning before terminating the process, allowing interrupt handling system 102 to take appropriate actions to preserve the state of the worker process 104.

In some implementations, interrupt handling system 102 may be part of a controller process within the cloud computing system. The cloud computing system may include a plurality of controller processes, each associated with one or more worker processes. When interrupt handling system 102 receives an interrupt indicator from its associated worker process (e.g., worker process 104), it may initiate a series of actions to manage the potential interruption and ensure the preservation of computational progress.

In some implementations, interrupt handling system 102 may evaluate the likelihood of process termination based on received indicators. Specifically, the system may determine (e.g., using interrupt detection subsystem), based on the interrupt indicator, whether the worker process is expected to be halted and removed by the cloud computing system within a predetermined time period. The cloud computing system may periodically halt and remove processes to manage assigned computing resources. For example, the system may analyze metadata in the interrupt indicator to estimate whether the worker process will be terminated within the next two minutes based on current resource allocation policies.

Interrupt type 209 may be used for determining the nature and origin of each interrupt. The interrupt type field within the interrupt message structure may contain information that allows the interrupt handling system to classify the interrupt based on various categories. These categories may include system-level interrupts, process-specific interrupts, or resource-related interrupts. By analyzing the interrupt type, the system may distinguish between interrupts originating externally within the cloud computing infrastructure and those resulting from operations performed by worker processes.

In some implementations, the interrupt type may indicate whether the interrupt was generated by the cloud computing system itself, such as in cases of resource reallocation, system maintenance, or spot instance termination warnings. For example, a spot interrupt type may signal that the worker process is subject to imminent termination due to changes in resource availability. Alternatively, the interrupt type may reveal that the interruption originated from within a worker process, potentially due to computational errors, task completion, or resource requests. This granular classification of interrupt types may enable the interrupt handling system to apply appropriate response strategies, such as initiating checkpointing procedures for system-originated interrupts or diagnosing and addressing issues for worker process-generated interrupts. The ability to accurately identify and categorize interrupt sources may enhance the system's capacity to manage workloads efficiently and maintain operational continuity in dynamic cloud environments.

Checkpoint generation subsystem 116 may use the information from the interrupt message 200 to begin preparing for a potential checkpoint operation. For example, by analyzing interrupt type 209 and interrupt data 212, checkpoint generation subsystem 116 may determine the urgency of the situation and prioritize its checkpoint generation activities accordingly. The interrupt handling system may request status updates from potentially affected processes. Specifically, based on determining that the worker process is expected to be halted and removed by the cloud computing system, interrupt handling system 102 may transmit (e.g., using communication subsystem 112) a status request to the worker process. For example, communication subsystem 112 may send a message to the worker process asking for its current progress and any completed results.

The status request transmitted by interrupt handling system 102 to the worker process may be structured as a lightweight, machine-readable message formatted in JSON or a similar data interchange format. This request may include fields such as a unique request identifier, a timestamp of when the request was initiated, and the ID of the worker process being queried. The status request may also specify which types of information are being requested, such as the current task ID, percentage of task completion, number of completed subtasks, estimated time to completion, and any error codes or messages encountered during execution.

Upon receiving the status request, the worker process may respond with a comprehensive snapshot of its current state. This response may include details such as the worker's process ID, the ID of the task currently being executed, a list of completed task IDs with their corresponding computational results, and a list of pending task IDs. The response may also contain resource utilization metrics such as CPU usage, memory consumption, and network activity. In some implementations, the worker process may include additional metadata such as checkpointing frequency, last successful checkpoint timestamp, and any performance metrics relevant to the specific computational tasks being performed. This detailed status information may enable interrupt handling system 102 to make informed decisions about how to manage the potential interruption and preserve the progress of the worker process.

Aa discussed above, the interrupt handling system may receive completed work from the affected worker process. Specifically, in response to the status request, interrupt handling system 102 (e.g., via communication subsystem 112) may receive, from the worker process, a first set of computational results for a first set of tasks that have been completed by the worker process. For example, the worker process may return partial results for three out of ten assigned computational tasks that it has finished so far.

In the context of financial trading activities, computational results processed by the worker process may encompass a wide range of outcomes. For numerical values, these results may include profit and loss calculations, such as a $15,000 profit on a particular trade or a $7,500 loss on another. Trade volumes may be reported, indicating the number of shares or contracts traded, such as 5,000 shares of a specific stock or 200 futures contracts. Price changes may be calculated and expressed as percentages or absolute values, for example, a 3.2% increase in a commodity price or a $2.50 decrease in a stock's value.

Trade risk assessments may form another category of computational results. These may include evaluations of market volatility risk, such as "Elevated risk due to geopolitical tensions affecting oil prices" or "Low risk in stable blue-chip equities market." Liquidity risk calculations may result in outputs like "High risk: thinly traded small-cap stock" or "Minimal liquidity risk in major currency pair trading." Counterparty risk assessments may produce results such as "Moderate risk: new trading partner with limited credit history" or "Negligible counterparty risk with AAA-rated financial institution."

The worker process may also generate results related to trade execution and performance. These may include successful trade confirmations like "Limit order executed: Bought 1000 shares at $50.25" or "Options contract sold at specified strike price." Partial fills may be reported as "65% of buy order filled at market open" or "Remaining 30% of sell order pending execution." Failed or problematic trades may result in outputs such as "Order rejected due to insufficient funds" or "Trade execution delayed due to circuit breaker activation." Additionally, the computational results may include performance metrics like "Trading algorithm outperformed benchmark by 2.3%" or "High-frequency trading strategy achieved 98.5% successful execution rate in volatile market conditions."

FIG. 3 illustrates an excerpt of a task data structure 300 that may be received by interrupt handling system 102 in response to a status request sent to a worker process. Task data structure 300 may contain multiple fields including a task identifier 303 and a computational result 306. Other fields may be included in task data structure 300. Task identifier 303 may include multiple unique identifiers, which may represent distinct computational tasks assigned to the worker process. Task identifier may be numerical, alphanumeric, or other suitable identifier types. Computational result 306 field may contain corresponding results for each task (e.g., numerical and/or alphanumeric output).

When interrupt handling system 102 receives this data structure, it may process the information to determine which tasks have been completed and what results have been generated. The system may analyze the task identifiers to track progress and identify any tasks that may still be pending or incomplete. The association between tasks and their results is maintained through the alignment of each task identifier 303 and computational result 306. This structure allows the interrupt handling system to efficiently match each task with its corresponding output.

Upon receiving and processing this task data structure, the interrupt handling system may use this information to generate a checkpoint, update its internal state regarding task completion, or make decisions about how to handle potential interruptions to the worker process. The system may also use this data to prepare for task redistribution or result aggregation, if necessary.

The interrupt handling system may identify remaining work for the affected process. Specifically, interrupt handling system 102 may (e.g., via checkpoint generation subsystem 116) determine, based on the first set of computational results, a second set of tasks that have not been completed by the worker process. The first set of tasks and the second set of tasks may have been assigned to the worker process. For example, if the worker process was assigned ten total tasks and returned results for three, the system may determine that seven tasks remain incomplete.

FIG. 4 illustrates an excerpt of a task data structure 400 that may be used by the interrupt handling system to identify tasks that have not been completed by a worker process. Task data structure 400 may include a task identifier 403 and a computational result 406. Task data structure 400 may include other fields, as necessary. This structure provides a clear and efficient way to track the status of multiple tasks assigned to a worker process.

In task data structure 400, the task identifier 403 may unique numerical or other types of identifiers for each task. The corresponding computational result 406 for each task. Null values may indicate that the tasks have not yet been completed or that results have not been received. By analyzing this data structure, the interrupt handling system is able to quickly identify which tasks lack computational results and may therefore be considered incomplete.

The organization of task data structure 400 allows the interrupt handling system to efficiently determine the second set of tasks that have not been completed by the worker process. By comparing the task identifiers with their corresponding computational results, the system may generate a list of tasks that require further processing or reassignment. This information may be crucial for checkpoint generation subsystem 116 when creating a checkpoint data structure that accurately reflects the current state of task completion and ensures that no unfinished work is lost during an interrupt event.

In some implementations, interrupt handling system 102 may analyze task completion status to identify unfinished work. Specifically, interrupt handling system 102 may determine, based on the first set of computational results, a second set of tasks that have not been completed by worker process 104. The first set of tasks and the second set of tasks may have been assigned to worker process 104. For example, checkpoint generation subsystem 116 may compare the received results against the original task list to identify outstanding tasks.

FIG. 4 illustrates an excerpt of task data structure 400 that may be used by interrupt handling system 102 to identify tasks that have not been completed by worker process 104. Task data structure 400 may include task identifier 403 and computational result 406. Task data structure 400 may include other fields, as necessary. This structure may provide a clear and efficient way to track the status of multiple tasks assigned to worker process 104.

In task data structure 400, task identifier 403 may contain unique numerical or other types of identifiers for each task. Computational result 406 may correspond to each task. Null values in computational result 406 may indicate that the tasks have not yet been completed or that results have not been received. By analyzing task data structure 400, interrupt handling system 102 may quickly identify which tasks lack computational results and may therefore be considered incomplete.

In some implementations, organization of task data structure 400 may allow interrupt handling system 102 to efficiently determine the second set of tasks that have not been completed by worker process 104. By comparing task identifiers 403 with corresponding computational results 406, interrupt handling system 102 may generate a list of tasks that require further processing or reassignment. This information may be crucial for checkpoint generation subsystem 116 when creating a checkpoint data structure that accurately reflects the current state of task completion and ensures that no unfinished work is lost during an interrupt event.

In some implementations, interrupt handling system 102 may handle both external and internal disruption events. For external disruption events, such as scaled down infrastructure or spot removal, interrupt detection subsystem 114 may receive signals from the cloud computing environment indicating imminent resource reallocation. In response, interrupt handling system 102 may initiate the task completion analysis process to identify and preserve progress on incomplete tasks. For internal disruption events, such as calculation crashes or out of memory errors, communication subsystem 112 may receive error messages from worker process 104. Interrupt handling system 102 may then analyze task data structure 400 to determine which tasks were affected by the internal error and require reprocessing or error handling.

The interrupt handling system may create a record of completed and remaining work. Specifically, the system may generate, for the worker process, a checkpoint data structure that indicates that the first set of tasks has been completed and that the second set of tasks has not been completed. For example, checkpoint generation subsystem 116 may create a file listing completed tasks with their results and uncompleted tasks marked as pending.

FIG. 5 illustrates an excerpt of a checkpoint data structure 500 that includes three distinct fields: task identifier 503, computational result 506, and task data 509. More or less fields may be included in a given checkpoint data structure. This structure provides a comprehensive format for tracking and managing computational tasks, their outcomes, and associated data within a cloud computing environment. Task identifier 503 field may contain unique numerical, alphanumerical, or other suitable identifiers for each task. These identifiers allow the system to uniquely reference and track individual computational tasks within the broader workflow. Computational result 506 field shows the status or outcome of calculations for each task, indicating a completed task with an associated result, while subsequent entries may represent tasks that are still in progress or have not yet been executed. Task data 509 field may contain additional information related to each task. This field may store various types of metadata, parameters, or other task-specific information that is relevant to the execution or management of the task.

The organization of these fields within the checkpoint data structure 500 allows the interrupt handling system to efficiently capture and manage the state of multiple computational tasks. By combining task identifiers, results, and associated data in a single structure, the system can quickly assess the progress of work, identify completed and pending tasks, and preserve critical information in the event of an interruption or system failure. This comprehensive approach to checkpointing may enhance the resilience and continuity of operations within the cloud computing environment.

Checkpoint generation subsystem 116 of interrupt handling system 102 may populate checkpoint data structure 500 based on information received from worker process 104. For completed tasks, checkpoint generation subsystem 116 may input the task identifier into task identifier 503, the corresponding result into computational result 506, and any relevant task-specific data into task data 509. For uncompleted tasks, checkpoint generation subsystem 116 may input the task identifier into task identifier 503, leave computational result 506 as null or empty, and include any available task data in task data 509.

In some cases, interrupt handling system 102 may include remoting hooks to determine if calculations need to be distributed across multiple pods 108a-108n. These remoting hooks may analyze the complexity and resource requirements of tasks to decide if they should be executed locally or distributed for parallel processing. The decision made by the remoting hooks may be reflected in task data 509 of checkpoint data structure 500.

Interrupt handling system 102 may update checkpoint data structure 500 when worker process 104 completes a subsequent task. Communication subsystem 112 may receive a task completion message from worker process 104. Checkpoint generation subsystem 116 may then update checkpoint data structure 500 by moving the completed task from the set of uncompleted tasks to the set of completed tasks, and updating the corresponding computational result 506 and task data 509 fields.

In some implementations, interrupt handling system 102 may include optimization hooks to determine if distributed calculation steps can be grouped together and run on a single processor. These optimization hooks may analyze the dependencies between tasks and their resource requirements to identify opportunities for consolidation. The grouping decisions made by the optimization hooks may be recorded in task data 509 of checkpoint data structure 500.

Interrupt handling system 102 may use directed acyclic graphs to structure and parallelize complex calculations. These graphs may represent the dependencies and flow of calculations, allowing for efficient distribution and execution of tasks across multiple pods 108a-108n. The structure of these graphs may be encoded within task data 509 of checkpoint data structure 500, providing a comprehensive representation of the computational workflow.

By maintaining and updating checkpoint data structure 500, interrupt handling system 102 may ensure that computational progress is preserved even in the event of interruptions or failures in worker process 104. This structured approach to checkpointing may enhance the resilience and efficiency of distributed computations within computing environment 100.

The interrupt handling system may save the completed work and progress record. Specifically, the system may transmit, to be recorded within the cloud computing system, a computational payload including the first set of computational results and the checkpoint data structure. For example, the communication subsystem may send the partial results and checkpoint file to a central database within the cloud to be stored for later retrieval and processing.

The transmission of the computational payload may serve multiple purposes within the cloud computing system. Interrupt handling system 102 may ensure that completed work is preserved even if worker process 104 is terminated. By storing the first set of computational results, the cloud computing system may avoid redundant recalculation of completed tasks. The checkpoint data structure may provide a snapshot of the overall task progress, allowing for efficient task resumption or redistribution if needed.

In some cases, interrupt handling system 102 may adjust removal priorities for worker processes based on their execution time and task completion status. Interrupt handling system 102 may raise the removal priority of a worker process that has been executing for a given time period, indicating that the worker process has become more important. Conversely, interrupt handling system 102 may lower the removal priority of a worker process that has completed one or more operations within its assigned task list.

In some implementations, interrupt handling system 102 may receive a controller interrupt indicating that the controller process will be halted and removed by the cloud computing system. Based on receiving the controller interrupt, interrupt handling system 102 may signal to the worker process 104 to stop further processing. This signaling may help prevent data loss or inconsistencies that could occur if worker process 104 continues executing without proper management. Furthermore, interrupt handling system 102 may raise removal priorities for multiple worker processes after a predetermined time has passed. This adjustment may help balance resource allocation and ensure fair treatment of long-running processes within the cloud computing environment.

Interrupt handling system 102 may initiate new controller and worker processes with assigned task lists and removal priorities. Interrupt handling system 102 may assign a new task list to a new worker process via a new controller process. Initially, interrupt handling system 102 may assign a first removal priority to the new worker process, which may be used by the cloud computing system when determining which processes to halt and remove based on resource constraints.

Interrupt handling system 102 may generate the checkpoint data structure by inputting the first set of tasks into the checkpoint data structure. The system may assign, within the checkpoint data structure, a corresponding computational result to each task in the first set of tasks. Interrupt handling system 102 may also input the second set of tasks into the checkpoint data structure. The system may generate, within the checkpoint data structure, a corresponding flag for each task in the second set of tasks. The corresponding flag may indicate that a corresponding task has not been completed.

In some implementations, interrupt handling system 102 may populate the checkpoint data structure 500 with task information, as discussed above. For completed tasks, the system may input the task identifier into the task identifier 503. The system may then assign the corresponding result to the computational result 506. Any relevant task-specific data may be included in the task data 509. For uncompleted tasks, the system may input the task identifier into the task identifier 503. The computational result 506 may be left as null or empty. Any available task data may be included in the task data 509.

The checkpoint generation subsystem 116 may update the checkpoint data structure 500 when a worker process 104 completes a subsequent task. The communication subsystem 112 may receive a task completion message from the worker process 104. The checkpoint generation subsystem 116 may then update the checkpoint data structure 500. The completed task may be moved from the set of uncompleted tasks to the set of completed tasks. The corresponding computational result 506 and task data 509 fields may be updated. This structured approach to checkpointing may enhance the resilience and efficiency of distributed computations within the computing environment 100. The system may ensure that computational progress is preserved even in the event of interruptions or failures in the worker process 104.

In some implementations, interrupt handling system 102 may receive a task completion message indicating that a subsequent task of the second set of tasks has been completed by worker process 104. The task completion message may include a corresponding computational result. Communication subsystem 112 may handle the reception of this message from worker process 104.

Upon receiving the task completion message, checkpoint generation subsystem 116 may update checkpoint data structure 500. The system may remove the subsequent task from the second set of tasks, which represents uncompleted tasks. The system may then add the subsequent task to the first set of tasks, which represents completed tasks. This operation may effectively move the task from an "uncompleted" status to a "completed" status within the data structure.

Interrupt handling system 102 may update the corresponding computational result 506 field in the checkpoint data structure 500. The system may associate the newly completed task with its corresponding result received in the task completion message. This update may involve modifying the entry in the computational result 506 field from a null or empty value to the actual result of the computation. Checkpoint generation subsystem 116 may also update the task data 509 field for the completed task. This update may include modifying or adding relevant metadata, execution parameters, or other task-specific information that may be useful for future reference or analysis.

Furthermore, interrupt handling system 102 may generate an updated checkpoint data structure. This updated structure may reflect the current state of task completion, including the newly completed task and its associated data. Interrupt handling system 102 (e.g., using communication subsystem 112) may then transmit the updated checkpoint data structure to be recorded within the cloud computing system. This transmission may ensure that the latest task completion information is preserved and accessible within computing environment 100. The system may store this updated structure in a central database or another suitable storage location within the cloud infrastructure.

By maintaining and transmitting these updated check-point data structures, interrupt handling system 102 may provide a robust mechanism for tracking task progress and preserving computational results. This approach may enhance the system's ability to handle interruptions, resume tasks efficiently, and maintain data integrity across distributed computing processes.

In some implementations, interrupt handling system 102 may receive a controller interrupt at the controller process. This controller interrupt may indicate that the controller process will be halted and removed by the cloud computing system. The interrupt may be received as a result of the cloud computing system may periodically halting and removing processes to manage assigned computing resources.

Based on receiving the controller interrupt, interrupt handling system 102 may signal to worker process 104 to stop further processing. This signaling may be performed by the communication subsystem 112. Communication subsystem 112 may transmit a stop processing message to worker process 104 over the network 150.

Worker process 104 may receive the stop processing signal and initiate a graceful shutdown procedure. This procedure may include completing any in-progress atomic operations, flushing data buffers, and releasing any held resources. Worker process 104 may also generate checkpoint data for checkpoint data structure 500 before ceasing operations.

Interrupt handling system 102 may monitor the worker process 104 for confirmation of the shutdown. Interrupt detection subsystem 114 may wait for a shutdown confirmation message from worker process 104. If the confirmation is not received within a predetermined timeout period, interrupt handling system 102 may determine that the worker process is unresponsive (e.g., has crashed) and stop processing any data received from that worker process.

Interrupt handling system 102 may also transmit the final checkpoint data structures for worker process 104 to a persistent storage location within the cloud computing system. This transmission may be handled by communication subsystem 112. The persistent storage may be a distributed database or a cloud storage service that ensures data durability. By signaling the worker process 104 to stop processing when the controller process is about to be halted, interrupt handling system 102 may help prevent data loss or inconsistencies. This approach may ensure that worker process 104 does not continue executing without proper management, which could lead to orphaned or inconsistent computational states within the cloud computing environment.

Interrupt handling system 102 may initiate a new controller process and a new worker process within the cloud computing system. Interrupt handling system 102 may assign a new task list to the new worker process via the new controller process. Interrupt handling system 102 may also assign a first removal priority to the new worker process. The cloud computing system may halt and remove worker processes and controller processes based on an assigned removal priority. That is, worker processes with lower priority will be removed first before worker processes with a higher priority. In some implementations, instead of a priority, a removal cost may be used. Thus, the cloud computing system may remove worker processes with lower removal costs first.

Subsequently to assigning the first removal priority, interrupt handling system 102 may determine that the new worker process has been executing for a given time period.

Based on determining that the new worker process has been executing for the given time period, interrupt handling system 102 may raise the first removal priority to indicate that the new worker process has become more important than when the first removal priority was assigned.

Interrupt handling system 102 may determine that one or more operations within the new task list have been completed by the new worker process and may generate a new checkpoint data structure for the new worker process. Interrupt handling system 102 may then assign a second removal priority of a lower value indicating that the new worker process is less important than when the first removal priority was raised. That is, when a checkpoint is created, if a worker process is removed, less work will be lost. Thus, the priority and/or removal cost is now lower. In some implementations, interrupt handling system 102 may determine that a predetermined amount of time has passed. Based on the determination, interrupt handling system 102 may raise a plurality of removal priorities for a plurality of worker processes that have not completed execution. That is, the longer a worker process is active without a checkpoint, the more important it becomes and the more costlier (in terms of work lost) it becomes to remove the particular worker process.

Interrupt handling system 102 may determine that one or more operations within the new task list have been completed by the new worker process. Based on this determination, interrupt handling system 102 may generate a new checkpoint data structure for the new worker process. This checkpoint data structure may include information about completed tasks, their results, and any relevant metadata.

After generating the new checkpoint data structure, interrupt handling system 102 may assign a second removal priority to the new worker process. This second removal priority may have a lower value than the first removal priority. The lower value may indicate that the new worker process is less important than when the first removal priority was assigned. That is, interrupt handling system 102 may adjust the removal priority based on the creation of checkpoints. When a checkpoint is created, the potential loss of work if the worker process is removed may be reduced. This reduction in potential work loss may be reflected in the lowered removal priority or cost.

In some implementations, interrupt handling system 102 may use a removal cost metric instead of a removal priority. The cloud computing system may remove worker processes with lower removal costs first. After creating a checkpoint, interrupt handling system 102 may lower the removal cost of the worker process, reflecting the reduced impact of potential removal. Interrupt handling system 102 may periodically reassess the removal priorities or costs of worker processes. The system may determine that a predetermined amount of time has passed since the last checkpoint or priority adjustment. Based on this determination, interrupt handling system 102 may raise the removal priorities for a plurality of worker processes that have not completed execution or created recent checkpoints.

As worker processes continue to execute without creating checkpoints, they may become more important in terms of preserving computational progress. Interrupt handling system 102 may reflect this increased importance by raising the removal priority or increasing the removal cost over time. This adjustment may help protect long-running processes from premature termination. Interrupt handling system 102 may help maintain a balance between efficient resource allocation and preserving computational progress. By dynamically adjusting removal priorities based on checkpoint creation and execution time, the system may optimize the use of cloud computing resources while minimizing the risk of losing significant amounts of completed work.

In some implementations, interrupt handling system 102 this component may be called Pod Defender. The Pod Defender may be deployed with all pods and may have awareness of what each pod is doing. This awareness may allow interrupt handling system 102 to make informed decisions about the status of worker processes.

As discussed above, the Pod Defender may track how long a worker process 104 has been working and how long it has been since the last checkpoint. This information may be used to assess the potential impact of halting and removing worker process 104. For example, if worker process 104 has been running for a long time without a recent checkpoint, interrupt handling system 102 may determine that, if removed, the computational cost would be high.

Furthermore, the Pod Defender may periodically update a pod deletion cost for each container. The pod deletion cost may be used by the cloud computing system to determine which pods to remove when managing resources. Interrupt handling system 102 may use this information to estimate the likelihood of a worker process 104 being halted and removed. To balance the need for up-to-date information with constraints on API call budgets, the Pod Defender may update the pod deletion cost every 5-10 minutes. This update frequency may allow interrupt handling system 102 to maintain reasonably current information about the status of worker processes without overwhelming the cloud computing system's API.

The pod deletion cost may be represented as an integer value. This integer may correspond to the number of minutes of unsaved work for a given worker process 104. For instance, if worker process 104 has been running for 30 minutes since its last checkpoint, the pod deletion cost may be set to 30. Interrupt handling system 102 may use this value to prioritize which worker processes are most critical to protect from interruption.

By considering these factors, interrupt handling system 102 may make informed decisions about whether a worker process 104 is likely to be halted and removed. This determination may guide subsequent actions, such as initiating checkpoints or redistributing workloads, to minimize data loss and maintain computational efficiency in the face of potential interruptions.

Figure 6:
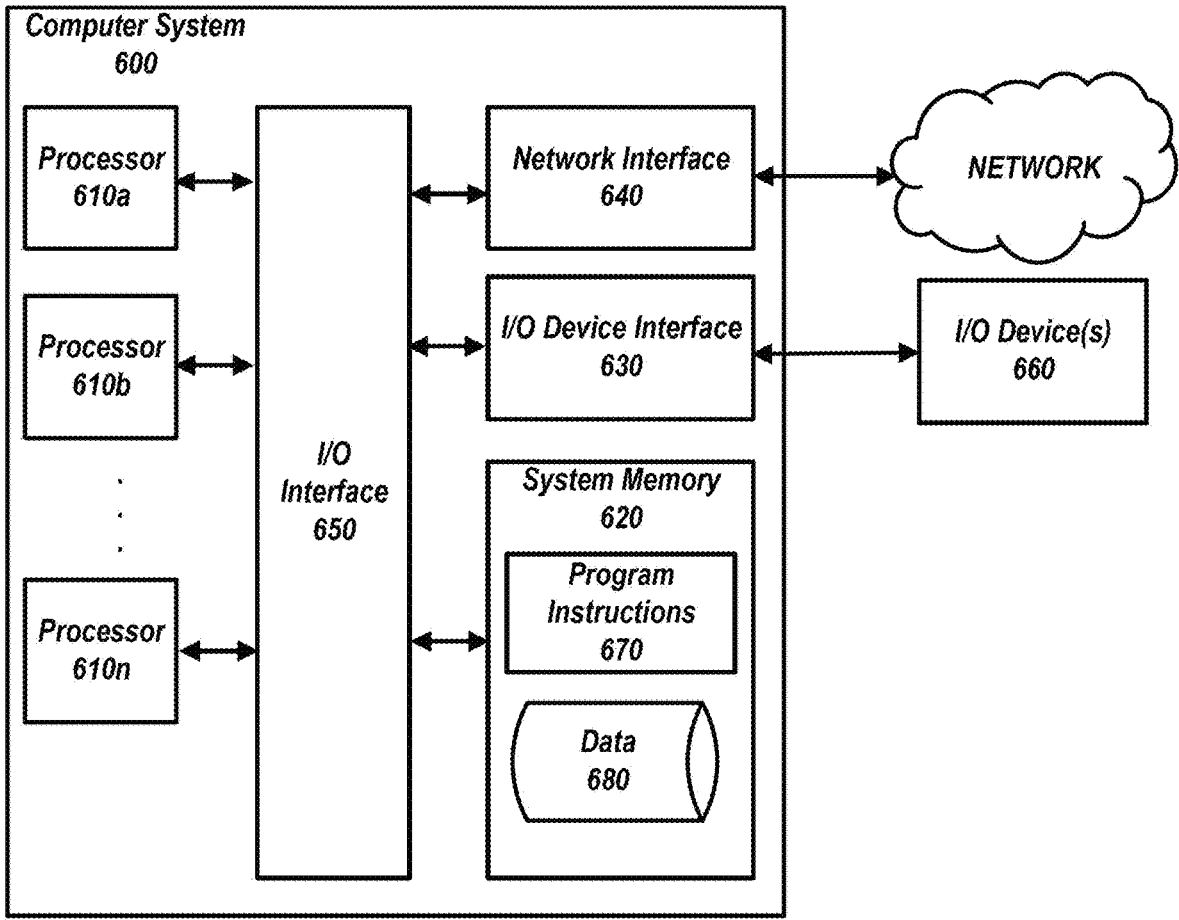
FIG. 6 illustrates a computing device, according to aspects of the present disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
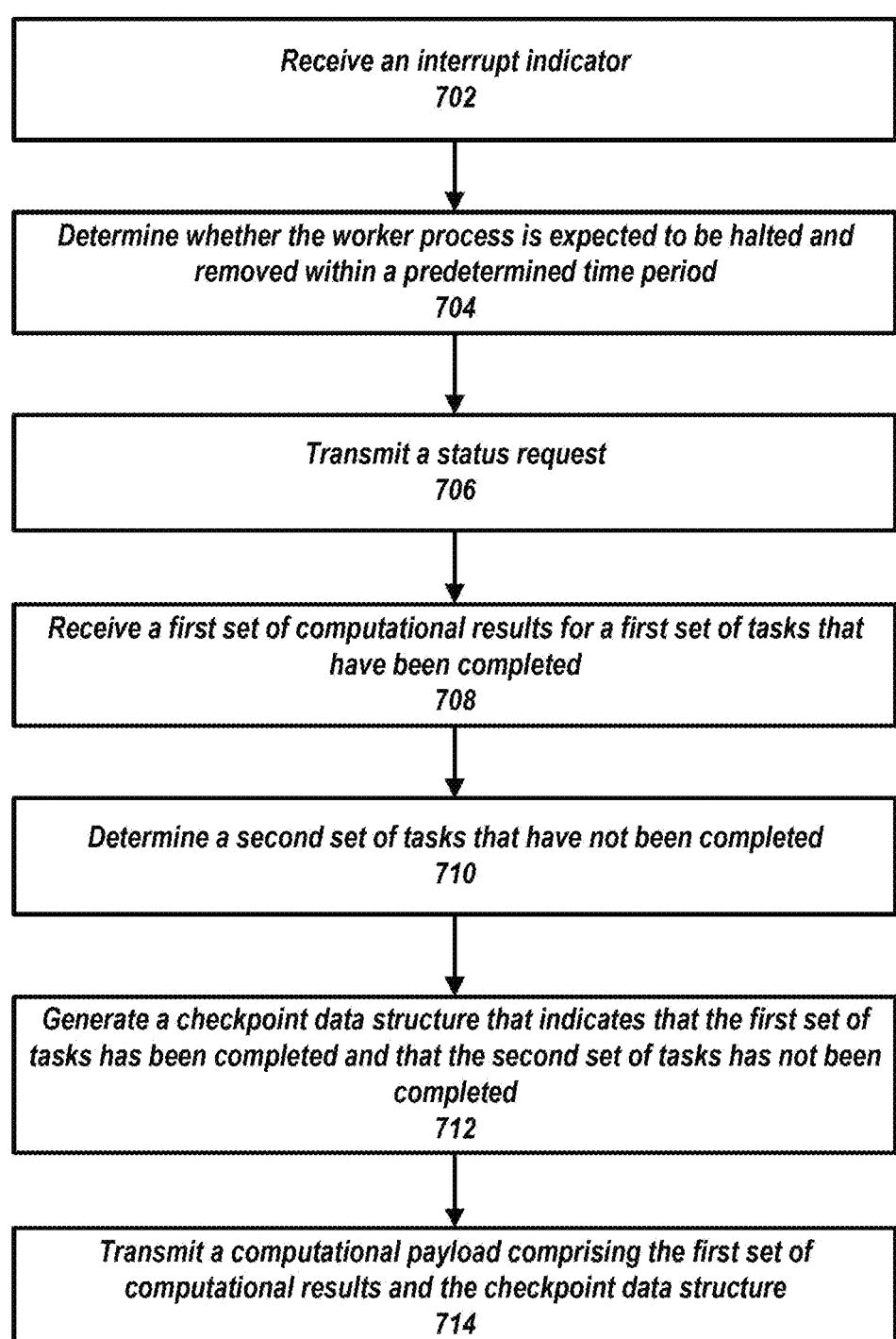
FIG. 7 illustrates a flowchart of a process for handling interrupts in a cloud computing system, according to an embodiment.

FIG. 7 illustrates a flowchart of process 700 performed by interrupt handling system 102, focusing on the actions taken to handle interrupts in a cloud computing environment. At operation 702, interrupt handling system 102 receives an interrupt indicator. This operation involves network interface 640 of computing system 600, as shown in FIG. 6, which facilitates the receipt of external data such as interrupt signals from worker processes. In operation 704, interrupt handling system 102 determines whether the worker process is expected to be halted and removed within a predetermined time period. This determination is made by one or more processors 610*a*-610*n* (FIG. 6) executing program instructions 670 stored in system memory 620.

Based on the determination made in operation 704, interrupt handling system 102 proceeds to operation 706, where it transmits a status request to the worker process. This transmission is facilitated by the network interface 640 and I/O interface 650 of computing system 600 (FIG. 6). At operation 708, interrupt handling system 102 receives a first set of computational results for completed tasks from the worker process. This reception of data is handled by the network interface 640 and processed by processors 610*a*-610*n* (FIG. 6).

Moving to operation 710, interrupt handling system 102 determines a second set of tasks that have not been completed by the worker process. This determination is made by processors 610*a*-610*n* executing program instructions 670 stored in system memory 620 (FIG. 6). In operation 712, interrupt handling system 102 generates a checkpoint data structure. This operation involves processors 610*a*-610*n* creating and populating a data structure in system memory 620 (FIG. 6) that indicates which tasks have been completed and which have not. Finally, at operation 714, interrupt handling system 102 transmits a computational payload comprising the first set of computational results and the checkpoint data structure. This transmission is carried out using the network interface 640 and I/O interface 650 of computing system 600 (FIG. 6), sending the data to be recorded within the cloud computing system.

The following examples pertain to further embodiments.

1. A system for handling interrupts, the system comprising: one or more processors; and one or more memories configured to store instructions that when executed by the one or more processors perform operations comprising: receiving, using a controller process of a plurality of controller processes within a cloud computing system, an interrupt indicator from a worker process of a plurality of worker processes, wherein the interrupt indicator signals a potential interruption to the worker process, wherein each worker process of the plurality of worker processes is associated with a corresponding controller process of the plurality of controller processes, and wherein each controller process manages a corresponding worker process; determining, based on the interrupt indicator, whether the worker process is expected to be halted and removed by the cloud computing system within a predetermined time period, wherein the cloud computing system periodically halts and removes processes to manage assigned computing resources; based on determining that the worker process is expected to be halted and removed by the cloud computing system, transmitting a status request to the worker process; in response to the status request, receiving, from the worker process, a first set of computational results for a first set of tasks that have been completed by the worker process; determining, based on the first set of computational results, a second set of tasks that have not been completed the worker process, wherein the first set of tasks and the second set of tasks have been assigned to the worker process; generating, for the worker process, a checkpoint data structure that indicates that the first set of tasks has been completed and that the second set of tasks has not been completed; and transmitting, to be recorded within the cloud computing system, a computational payload comprising the first set of computational results and the checkpoint data structure.

2. The system of claim 1, wherein the status request requests one or more computational results for the first set of tasks that have been completed.

3. The system of any of claims 1-2, wherein the instructions for generating the checkpoint data structure further cause the one or more processors to perform operations comprising: inputting, into the checkpoint data structure, the first set of tasks; assigning, within the checkpoint data structure a corresponding computational result to each task in the first set of tasks; inputting, into the checkpoint data structure, the second set of tasks; and generating, within the checkpoint data structure, a corresponding flag for each task in the second set of tasks, wherein the corresponding flag indicates that a corresponding task has not been completed.

4. The system of any of claims 1-3, wherein the instructions further cause the one or more processors to perform operations comprising: receiving, using the controller process, a task completion message indicating that a subsequent task of the second set of tasks has been completed by the worker process, wherein the task completion message comprises a corresponding computational result; updating the checkpoint data structure to remove the subsequent task from the second set of tasks and add the subsequent task to the first set of tasks with the corresponding computational result to generate an updated checkpoint data structure; and transmitting the updated checkpoint data structure to be recorded within the cloud computing system.

5. The system of any of claims 1-4, wherein the instructions further cause the one or more processors to perform operations comprising: receiving, at the controller process, a controller interrupt, wherein the controller interrupt indicates that the controller process will be halted and removed by the cloud computing system; and based on receiving the controller interrupt, signaling, to the worker process, to stop further processing.

6. The system of any of claims 1-5, wherein the instructions further cause the one or more processors to perform operations comprising: initiating, within the cloud computing system, a new controller process and a new worker process; assigning a new task list to the worker process via the new controller process; assigning a first removal priority to the new worker process, the cloud computing system halts and removes worker processes and controller processes based on an assigned removal priority; subsequently to assigning the first removal priority, determining that the new worker process has been executing for a given time period; and based on determining that the new worker process has been executing for the given time period, raising the first removal priority to indicate that the new worker process has become more important than when the first removal priority has been assigned.

7. The system of any of claims 1-6, wherein the instructions further cause the one or more processors to perform operations comprising: determining that one or more operations within the new task list have been completed by the new worker process; generating a new checkpoint data structure for the new worker process; and assigning a second removal priority to a lower value indicating that the new worker process is less important than when the first removal priority has been raised.

8. The system of any of claims 1-7, wherein the instructions further cause the one or more processors to perform operations comprising: determining that a predetermined amount of time has passed; and raising a plurality of removal priorities for a plurality of worker processes that have not completed execution.

9. One or more tangible, non-transitory, computer-readable media storing instructions that, when executed by a data processing apparatus, cause the data processing apparatus to perform operations comprising those of any of embodiments 1-8.

10. A method for executing embodiments 1-8.

11. A system comprising means for performing any of embodiments 1-8.

12. A system comprising cloud-based circuitry for performing any of embodiments 1-8.

We claim:

1. A system for handling interrupts, the system comprising:

one or more processors; and one or more memories configured to store instructions that when executed by the one or more processors perform operations comprising:

receiving, using a controller process of a plurality of controller processes within a cloud computing system, an interrupt indicator from a worker process of a plurality of worker processes, wherein the interrupt indicator signals a potential interruption to the worker process, wherein each worker process of the plurality of worker processes is associated with a corresponding controller process of the plurality of controller processes, and wherein each controller process manages a corresponding worker process;

determining, based on the interrupt indicator, whether the worker process is expected to be halted and removed by the cloud computing system within a predetermined time period, wherein the cloud computing system periodically halts and removes processes to manage assigned computing resources;

based on determining that the worker process is expected to be halted and removed by the cloud computing system, transmitting a status request to the worker process;

in response to the status request, receiving, from the worker process, a first set of computational results for a first set of tasks that have been completed by the worker process;

determining, based on the first set of computational results, a second set of tasks that have not been completed the worker process, wherein the first set of tasks and the second set of tasks have been assigned to the worker process;

generating, for the worker process, a checkpoint data structure that indicates task completion status;

inputting, into the checkpoint data structure, the first set of tasks and the second set of tasks;

assigning, within the checkpoint data structure a corresponding computational result to each task in the first set of tasks;

generating, within the checkpoint data structure, a corresponding flag for each task in the second set of tasks, wherein the corresponding flag indicates that a corresponding task has not been completed; and transmitting, to be recorded within the cloud computing system, a computational payload comprising the first set of computational results and the checkpoint data structure.

2. The system of claim 1, wherein the status request requests one or more computational results for the first set of tasks that have been completed.

3. The system of claim 1, wherein the instructions further cause the one or more processors to perform operations comprising:

receiving, using the controller process, a task completion message indicating that a subsequent task of the second set of tasks has been completed by the worker process, wherein the task completion message comprises the corresponding computational result;

updating the checkpoint data structure to remove the subsequent task from the second set of tasks and add the subsequent task to the first set of tasks with the corresponding computational result to generate an updated checkpoint data structure; and transmitting the updated checkpoint data structure to be recorded within the cloud computing system.

4. The system of claim 1, wherein the instructions further cause the one or more processors to perform operations comprising:

receiving, at the controller process, a controller interrupt, wherein the controller interrupt indicates that the controller process will be halted and removed by the cloud computing system; and based on receiving the controller interrupt, signaling, to the worker process, to stop further processing.

5. The system of claim 1, wherein the instructions further cause the one or more processors to perform operations comprising:

initiating, within the cloud computing system, a new controller process and a new worker process;

assigning a new task list to the worker process via the new controller process;

assigning a first removal priority to the new worker process, the cloud computing system halts and removes worker processes and controller processes based on an assigned removal priority;

subsequently to assigning the first removal priority, determining that the new worker process has been executing for a given time period; and based on determining that the new worker process has been executing for the given time period, raising the first removal priority to indicate that the new worker process has become more important than when the first removal priority has been assigned.

6. The system of claim 5, wherein the instructions further cause the one or more processors to perform operations comprising:

determining that one or more operations within the new task list have been completed by the new worker process;

generating a new checkpoint data structure for the new worker process; and assigning a second removal priority to a lower value indicating that the new worker process is less important than when the first removal priority has been raised.

7. The system of claim 5, wherein the instructions further cause the one or more processors to perform operations comprising:

determining that a predetermined amount of time has passed; and raising a plurality of removal priorities for one or more worker processes that have not completed execution.

8. A method for handling interrupts, the method comprising:

receiving, using a controller process of a plurality of controller processes within a cloud computing system, an interrupt indicator from a worker process of a plurality of worker processes, wherein the interrupt indicator signals a potential interruption to the worker process, wherein each worker process of the plurality of worker processes is associated with a corresponding controller process of the plurality of controller processes, and wherein each controller process manages a corresponding worker process;

determining, based on the interrupt indicator, whether the worker process is expected to be halted and removed by the cloud computing system within a predetermined time period, wherein the cloud computing system periodically halts and removes processes to manage assigned computing resources;

based on determining that the worker process is expected to be halted and removed by the cloud computing system, transmitting a status request to the worker process;

in response to the status request, receiving, from the worker process, a first set of computational results for a first set of tasks that have been completed by the worker process;

determining, based on the first set of computational results, a second set of tasks that have not been completed the worker process, wherein the first set of tasks and the second set of tasks have been assigned to the worker process;

generating, for the worker process, a checkpoint data structure that indicates that the first set of tasks has been completed and that the second set of tasks has not been completed;

transmitting, to be recorded within the cloud computing system, a computational payload comprising the first set of computational results and the checkpoint data structure;

receiving, using the controller process, a task completion message indicating that a subsequent task of the second set of tasks has been completed by the worker process, wherein the task completion message comprises a corresponding computational result;

updating the checkpoint data structure to remove the subsequent task from the second set of tasks and add the subsequent task to the first set of tasks with the corresponding computational result to generate an updated checkpoint data structure; and transmitting the updated checkpoint data structure to be recorded within the cloud computing system.

9. The method of claim 8, wherein the status request requests one or more computational results for the first set of tasks that have been completed.

10. The method of claim 8, wherein generating the checkpoint data structure further comprises:

inputting, into the checkpoint data structure, the first set of tasks;

assigning, within the checkpoint data structure the corresponding computational result to each task in the first set of tasks;

inputting, into the checkpoint data structure, the second set of tasks; and generating, within the checkpoint data structure, a corresponding flag for each task in the second set of tasks, wherein the corresponding flag indicates that a corresponding task has not been completed.

11. The method of claim 8, further comprising:

receiving, at the controller process, a controller interrupt, wherein the controller interrupt indicates that the controller process will be halted and removed by the cloud computing system; and based on receiving the controller interrupt, signaling, to the worker process, to stop further processing.

12. The method of claim 8, further comprising:

initiating, within the cloud computing system, a new controller process and a new worker process;

assigning a new task list to the worker process via the new controller process;

assigning a first removal priority to the new worker process, the cloud computing system halts and removes worker processes and controller processes based on an assigned removal priority;

subsequently to assigning the first removal priority, determining that the new worker process has been executing for a given time period; and based on determining that the new worker process has been executing for the given time period, raising the first removal priority to indicate that the new worker process has become more important than when the first removal priority has been assigned.

13. The method of claim 12, further comprising:

determining that one or more operations within the new task list have been completed by the new worker process;

generating a new checkpoint data structure for the new worker process; and assigning a second removal priority to a lower value indicating that the new worker process is less important than when the first removal priority has been raised.

14. The method of claim 12, further comprising:

determining that a predetermined amount of time has passed; and raising a plurality of removal priorities for one or more worker processes that have not completed execution.

15. One or more non-transitory, computer-readable media storing instructions thereon that when executed by one or more processors perform operations comprising:

receiving, using a controller process of a plurality of controller processes within a cloud computing system, an interrupt indicator from a worker process of a plurality of worker processes, wherein the interrupt indicator signals a potential interruption to the worker process, wherein each worker process of the plurality of worker processes is associated with a corresponding controller process of the plurality of controller processes, and wherein each controller process manages a corresponding worker process;

determining, based on the interrupt indicator, whether the worker process is expected to be halted and removed by the cloud computing system within a predetermined time period, wherein the cloud computing system periodically halts and removes processes to manage assigned computing resources;

based on determining that the worker process is expected to be halted and removed by the cloud computing system, transmitting a status request to the worker process;

in response to the status request, receiving, from the worker process, a first set of computational results for a first set of tasks that have been completed by the worker process;

determining, based on the first set of computational results, a second set of tasks that have not been completed the worker process, wherein the first set of tasks and the second set of tasks have been assigned to the worker process;

generating, for the worker process, a checkpoint data structure that indicates that the first set of tasks has been completed and that the second set of tasks has not been completed;

transmitting, to be recorded within the cloud computing system, a computational payload comprising the first set of computational results and the checkpoint data structure;

initiating, within the cloud computing system, a new controller process and a new worker process;

assigning a new task list to the worker process via the new controller process;

assigning a first removal priority to the new worker process, the cloud computing system halts and removes worker processes and controller processes based on an assigned removal priority;

subsequently to assigning the first removal priority, determining that the new worker process has been executing for a given time period; and based on determining that the new worker process has been executing for the given time period, raising the first removal priority to indicate that the new worker process has become more important than when the first removal priority has been assigned.

16. The one or more non-transitory, computer-readable media of claim 15, wherein the status request requests one or more computational results for the first set of tasks that have been completed.

17. The one or more non-transitory, computer-readable media of claim 15, wherein the instructions for generating the checkpoint data structure further cause the one or more processors to perform operations comprising:

inputting, into the checkpoint data structure, the first set of tasks;

assigning, within the checkpoint data structure a corresponding computational result to each task in the first set of tasks;

inputting, into the checkpoint data structure, the second set of tasks; and generating, within the checkpoint data structure, a corresponding flag for each task in the second set of tasks, wherein the corresponding flag indicates that a corresponding task has not been completed.

18. The one or more non-transitory, computer-readable media of claim 15, wherein the instructions further cause the one or more processors to perform operations comprising:

receiving, using the controller process, a task completion message indicating that a subsequent task of the second set of tasks has been completed by the worker process, wherein the task completion message comprises a corresponding computational result;

updating the checkpoint data structure to remove the subsequent task from the second set of tasks and add the subsequent task to the first set of tasks with the corresponding computational result to generate an updated checkpoint data structure; and transmitting the updated checkpoint data structure to be recorded within the cloud computing system.

* * * * *